United States Patent
Onishi et al.

(10) Patent No.: US 10,462,432 B2
(45) Date of Patent: Oct. 29, 2019

(54) METHOD FOR DRIVING IMAGE PICKUP APPARATUS, AND SIGNAL PROCESSING METHOD

(71) Applicant: CANON KABUSHIKI KAISHA, Tokyo (JP)

(72) Inventors: Tomoya Onishi, Ayase (JP); Noriyuki Kaifu, Hachioji (JP); Fujio Kawano, Kawasaki (JP); Hisashi Takado, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 112 days.

(21) Appl. No.: 14/973,393

(22) Filed: Dec. 17, 2015

(65) Prior Publication Data
US 2016/0191866 A1 Jun. 30, 2016

(30) Foreign Application Priority Data
Dec. 26, 2014 (JP) ................. 2014-084608

(51) Int. Cl.
*H04N 9/07* (2006.01)
*H04N 5/357* (2011.01)
*H04N 9/04* (2006.01)

(52) U.S. Cl.
CPC ............ *H04N 9/07* (2013.01); *H04N 5/357* (2013.01); *H04N 9/04* (2013.01); *H04N 9/045* (2013.01)

(58) Field of Classification Search
CPC ................. H04N 9/07; H04N 5/357
See application file for complete search history.

(56) References Cited

U.S. PATENT DOCUMENTS

| | | | |
|---|---|---|---|
| 8,890,981 B2 * | 11/2014 | Kasai | H04N 9/045 348/231.99 |
| 2007/0076269 A1 | 4/2007 | Kido et al. | |
| 2008/0218597 A1 | 9/2008 | Cho | |
| 2009/0040353 A1 | 2/2009 | Yamamoto | |
| 2011/0043670 A1 | 2/2011 | Azuma et al. | |
| 2015/0029358 A1 * | 1/2015 | Kaizu | H04N 9/07 348/223.1 |

FOREIGN PATENT DOCUMENTS

| | | |
|---|---|---|
| CN | 102124744 A | 7/2011 |
| CN | 102640184 A | 8/2012 |
| CN | 104170376 A | 11/2014 |
| JP | 2009044593 A | 2/2009 |
| JP | 2012188608 A | 10/2012 |
| JP | 2013508853 A | 3/2013 |
| JP | 2014155034 A | 8/2014 |
| WO | 2014006931 A1 | 1/2014 |

\* cited by examiner

*Primary Examiner* — Twyler L Haskins
*Assistant Examiner* — Fayez Bhuiyan
(74) *Attorney, Agent, or Firm* — Canon USA, Inc., IP Division

(57) ABSTRACT

A method for driving an image pickup apparatus is a method that generates image data using signals output by R, G, and B pixels contained in n frames, where n is an integer greater than or equal to two, and a signal or signals output by a W pixel contained in m frame or frames, where m is smaller than n, or that generates image data using signals output by R and B pixels contained in n frames and a signal or signals output by a G pixel contained in m frame or frames.

11 Claims, 14 Drawing Sheets

FIG. 3A

| R | G | R | G | R | G | R | G |
|---|---|---|---|---|---|---|---|
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |

FIG. 3B

| R | W | G | W | R | W | G | W |
|---|---|---|---|---|---|---|---|
| W | W | W | W | W | W | W | W |
| G | W | B | W | G | W | B | W |
| W | W | W | W | W | W | W | W |
| R | W | G | W | R | W | G | W |
| W | W | W | W | W | W | W | W |
| G | W | B | W | G | W | B | W |
| W | W | W | W | W | W | W | W |

FIG. 6

| CONDITION No. | BRIGHTNESS (lux) | NUMBER OF FRAMES FOR AVERAGING OF COLOR DATA (n) | NOISE EVALUATION | AFTERIMAGE EVALUATION |
|---|---|---|---|---|
| 1 | 10 | 1 | A | A |
| 2 | 10 | 4 | A | B |
| 3 | 1 | 1 | B | A |
| 4 | 1 | 4 | A | B |
| 5 | 0.1 | 1 | C | A |
| 6 | 0.1 | 4 | B | B |

FIG. 8

| CONDITION No. | BRIGHTNESS (lux) | NUMBER OF FRAMES FOR PROCESSING OF RESOLUTION DATA (m) | NUMBER OF FRAMES FOR PROCESSING OF COLOR DATA (n) | NOISE EVALUATION | AFTERIMAGE EVALUATION |
|---|---|---|---|---|---|
| 1 | 10 | 1 | 1 | A | A |
| 2 | 1 | 1 | 4 | A | B |
| 3 | 1 | 2 | 4 | A | C |
| 4 | 0.1 | 1 | 1 | D | A |
| 5 | 0.1 | 1 | 4 | C | B |
| 6 | 0.1 | 2 | 4 | B | C |
| 7 | 0.01 | 1 | 4 | D | B |
| 8 | 0.01 | 2 | 4 | C | C |
| 9 | 0.01 | 4 | 4 | B | D |

FIG. 9

| W | R | W | G | W | R | W | G |
|---|---|---|---|---|---|---|---|
| B | W | G | W | B | W | G | W |
| W | G | W | R | W | G | W | R |
| G | W | B | W | G | W | B | W |
| W | R | W | G | W | R | W | G |
| B | W | G | W | B | W | G | W |
| W | G | W | R | W | G | W | R |
| G | W | B | W | G | W | B | W |

FIG. 12

| R | G | B | G | R | G | B | G |
|---|---|---|---|---|---|---|---|
| G | G | G | G | G | G | G | G |
| B | G | R | G | B | G | R | G |
| G | G | G | G | G | G | G | G |
| R | G | B | G | R | G | B | G |
| G | G | G | G | G | G | G | G |
| B | G | R | G | B | G | R | G |
| G | G | G | G | G | G | G | G |

METHOD FOR DRIVING IMAGE PICKUP APPARATUS, AND SIGNAL PROCESSING METHOD

TECHNICAL FIELD

The present disclosure generally relates to image processing and, more particularly, to a method for driving an image pickup apparatus, and a signal processing method.

BACKGROUND ART

Image pickup apparatuses having a so-called Bayer array for obtaining a color image are often used. In an image pickup apparatus of this type, color filters (which may be denoted by CFs) each configured to transmit light of a specific wavelength component, such as light of red, green, or blue color, are arranged on an element surface on a pixel-by-pixel basis. Hereinafter, red, green, and blue colors will be denoted by R, G, and B, respectively. A pixel having a red (R) CF will be referred to as an R pixel, a pixel having a green (G) CF will be referred to as a G pixel, and a pixel having a blue (B) CF will be referred to as a B pixel. The R, G, and B pixels may be collectively referred to as RGB pixels.

Patent Literature 1 describes an image processing apparatus having RGB pixels and pixels with no CFs (hereinafter referred to as white pixels or W pixels). An image pickup apparatus described in Patent Literature 1 performs edge detection and blur correction on signals output by an image pickup element having an RGBW array, so as to perform color correlation re-mosaicing.

CITATION LIST

Patent Literature

PTL 1 Japanese Patent Laid-Open No. 2011-55038

An aspect of the present disclosure is to provide a technique for generating an image with reduced color noise in at least an image pickup apparatus having RGB pixels.

SUMMARY OF INVENTION

An aspect of the present disclosure is a method for driving an image pickup apparatus that includes an image pickup element and an output signal processor, the image pickup element having a plurality of color pixels, each having a color filter of one of red, green, and blue, and a white pixel. The method includes outputting, from the image pickup element to the output signal processor, signals output by the plurality of color pixels and a signal output by the white pixel; and generating, by the output signal processor, image data using the signals output by the plurality of color pixels contained in n frames, where n is an integer greater than or equal to two, and the signal or signals of the white pixel contained in m frame or frames, where m is smaller than n.

Another aspect of the present disclosure is a method for driving an image pickup apparatus that includes an image pickup element and an output signal processor, the image pickup element having a plurality of color pixels, each having a color filter of one of red, green, and blue. The method includes outputting, from the image pickup element to the output signal processor, signals output by the plurality of color pixels; and generating, by the output signal processor, image data using signals output by pixels having the color filters of red and blue and contained in n frames, where n is an integer greater than or equal to two, and a signal or signals of a pixel having the color filter of green and contained in m frame or frames, where m is smaller than n.

Another aspect of the present disclosure is a method for driving an image pickup apparatus that includes an image pickup element and an output signal processor, the image pickup element being configured to output color data and resolution data representing luminance. The method includes generating, by the output signal processor, image data using the color data contained in n frames, where n is an integer greater than or equal to two, and the resolution data contained in m frame or frames, where m is smaller than n.

Another aspect of the present disclosure is a signal processing method using color data and resolution data output by an image pickup element, the resolution data representing luminance. The method includes generating image data using the color data contained in n frames, where n is an integer greater than or equal to two, and the resolution data contained in m frame or frames, where m is smaller than n.

Further features of the present disclosure will become apparent from the following description of exemplary embodiments with reference to the attached drawings.

BRIEF DESCRIPTION OF DRAWINGS

FIGS. 3A and 3B each illustrate a color filter array of the image pickup element.

FIG. 6 shows evaluations of images generated by the image pickup apparatus.

FIG. 8 shows evaluations of images generated by the image pickup apparatus.

FIG. 9 illustrates a color filter array of an image pickup element.

FIG. 12 illustrates a color filter array of an image pickup element.

DESCRIPTION OF EMBODIMENTS

An image pickup apparatus according to each embodiment will now be described with reference to the drawings.

First Embodiment

Figure 1:
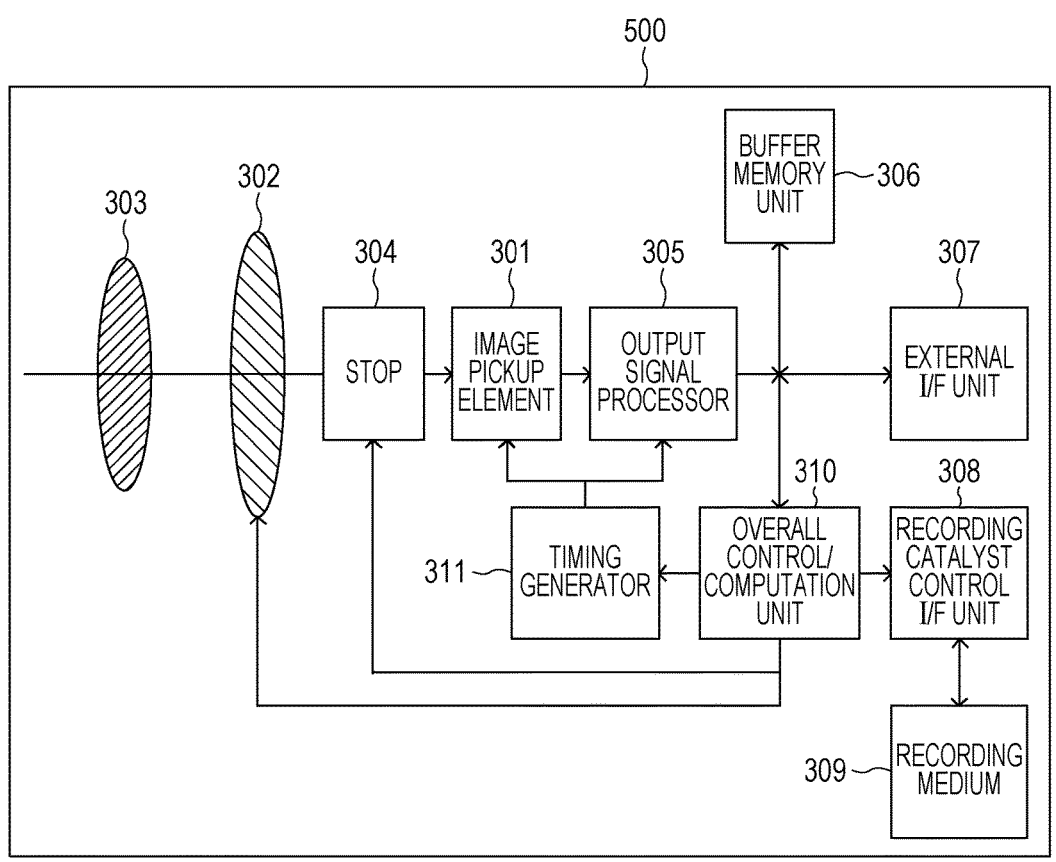
FIG. 1 illustrates a configuration of an image pickup apparatus.

FIG. 1 illustrates a configuration of an image pickup apparatus 500 according to the present embodiment.

The image pickup apparatus 500 is an apparatus that acquires an image or moving image using an image pickup element 301. Examples of the image pickup apparatus 500 include digital still cameras, digital camcorders, and surveillance cameras.

Referring to FIG. 1, the image pickup apparatus 500 includes a lens 302 that focuses an optical image of an object onto the image pickup element 301, a barrier 303 for protection of the lens 302, and a stop 304 for regulating the amount of light passed through the lens 302. The image pickup apparatus 500 further includes an output signal processor 305 that processes output signals from the image pickup element 301.

The output signal processor 305 includes a digital signal processing unit. The output signal processor 305 performs various types of correction and compression, as necessary, on signals output from the image pickup element 301, and outputs the resulting signals. When the signals output from the image pickup element 301 are analog signals, the output signal processor 305 may include an analog/digital converter circuit upstream of the digital signal processing unit. As used herein, the term "unit" generally refers to any combination of software, firmware, hardware, or other component, such as circuitry, that is used to effectuate a purpose.

The image pickup apparatus 500 also includes a buffer memory unit 306 for temporarily storing image data. The image pickup apparatus 500 further includes an external interface (I/F) unit 307 for communicating with external computers and the like. The image pickup apparatus 500 further includes a storage medium control interface (I/F) unit 308 for recording on, or reading from, a recording medium. The image pickup apparatus 500 further includes a recording medium 309 on or from which picked-up image data is recorded or read. The recording medium 309 is a semiconductor memory which is removable from, or included in, the image pickup apparatus.

The image pickup apparatus 500 further includes an overall control/computation unit 310 that not only performs various computations, but also controls an overall operation of the digital still camera. The image pickup apparatus 500 further includes a timing generator 311 that outputs various timing signals to the output signal processor 305. Control signals, such as timing signals, may be input from the outside of the image pickup apparatus 500, not from the timing generator 311. That is, the image pickup apparatus 500 includes at least the image pickup element 301 and the output signal processor 305 that processes output signals from the image pickup element 301.

Figure 2:
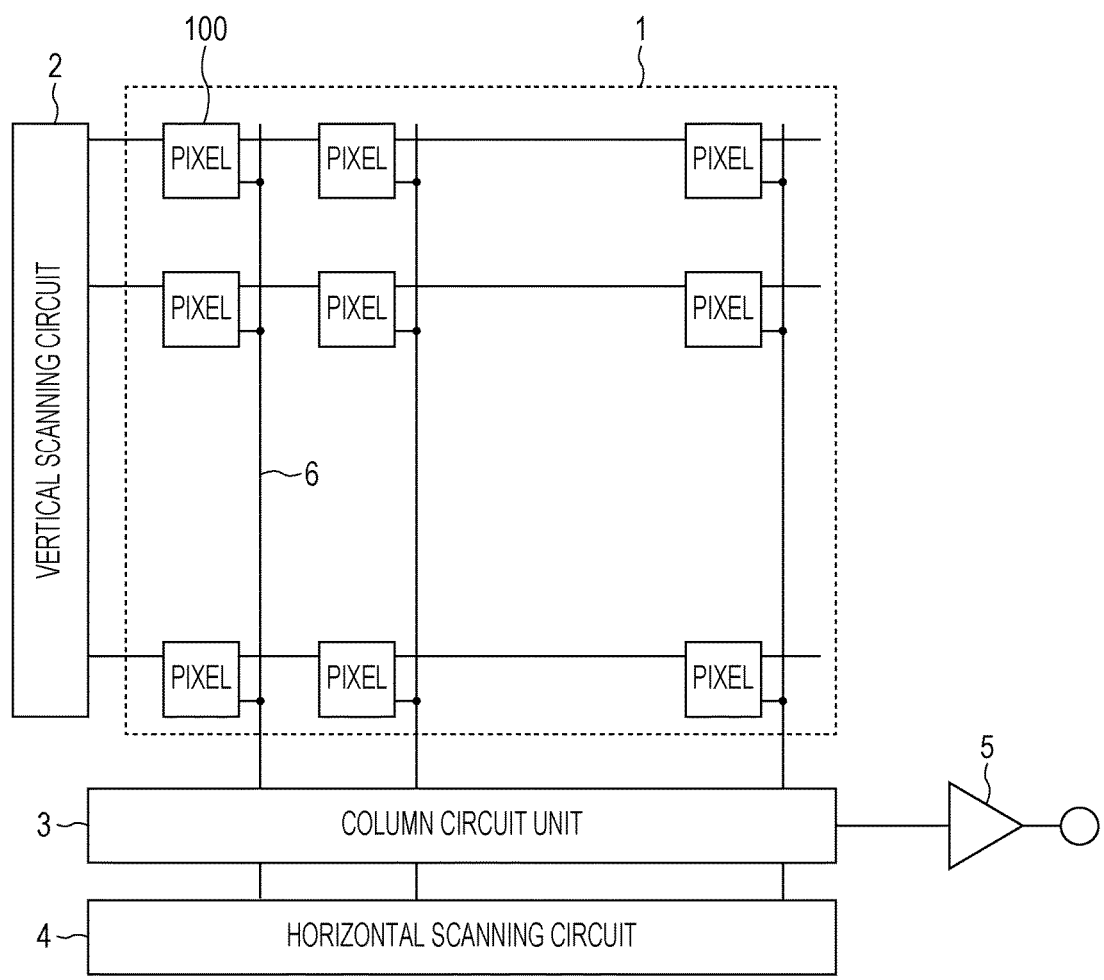
FIG. 2 illustrates a configuration of an image pickup element.

FIG. 2 is a block diagram illustrating an image pickup element of the present embodiment. The image pickup element of the present embodiment includes an image pickup region 1 having a pixel array including pixels 100 arranged in a matrix form, a vertical scanning circuit 2, a column circuit unit 3, a horizontal scanning circuit 4, and an output unit 5. The vertical scanning circuit 2 selects the pixels 100 on a row-by-row basis. The pixels 100 selected by the vertical scanning circuit 2 output signals based on incident light to a plurality of vertical signal lines 6. The vertical signal lines 6 each correspond to a column of pixels 100. The column circuit unit 3 includes a plurality of column circuits provided for the respective vertical signal lines 6 corresponding to the respective columns. Each of the plurality of column circuits generates signals by subtracting noise components from signals output from the pixels 100 to the corresponding vertical signal line 6. The horizontal scanning circuit 4 horizontally and sequentially scans the plurality of column circuits of the column circuit unit 3. Thus, signals are sequentially output to the output unit 5 from the column circuits for the respective columns in the column circuit unit 3. The output unit 5 outputs signals to the output signal processor 305 disposed outside the image pickup element 301.

FIGS. 3A and 3B each illustrate an array of color filters (CFs) for pixels. R, G, and B represent red, green, and blue color filters, respectively. W represents a white pixel, and indicates that no color filter is provided.

FIG. 3A illustrates a Bayer array having no W pixels. CFs are arranged in the ratio of R:G:B=1:2:1. More G pixels than R and B pixels are arranged, because human vision is more sensitive to wavelengths corresponding to green than to those corresponding to red and blue. Also, the sharpness of an image perceived by human vision is more strongly dependent on the luminance of light corresponding to the wavelengths of green than those of light corresponding to the wavelengths of red and blue.

FIG. 3B illustrates a CF array denoted by RGBW12. In a four-by-four pixel array, CFs are arranged in the ratio of R:G:B:W=1:2:1:12. Any of R, G, and B pixels, which are color pixels, is adjacent to W pixels in the up/down, right/left, and diagonal directions in plan view. That is, each of R, G, and B pixels is surrounded by eight W pixels. W pixels make up three-fourths of all pixels. Since each of RGB pixels, which are color pixels, is surrounded by W pixels, the accuracy of interpolation for the signal of each of R, G, and B pixels with a signal of a W pixel is higher than that in the CF array illustrated in FIG. 3A.

Figure 4:
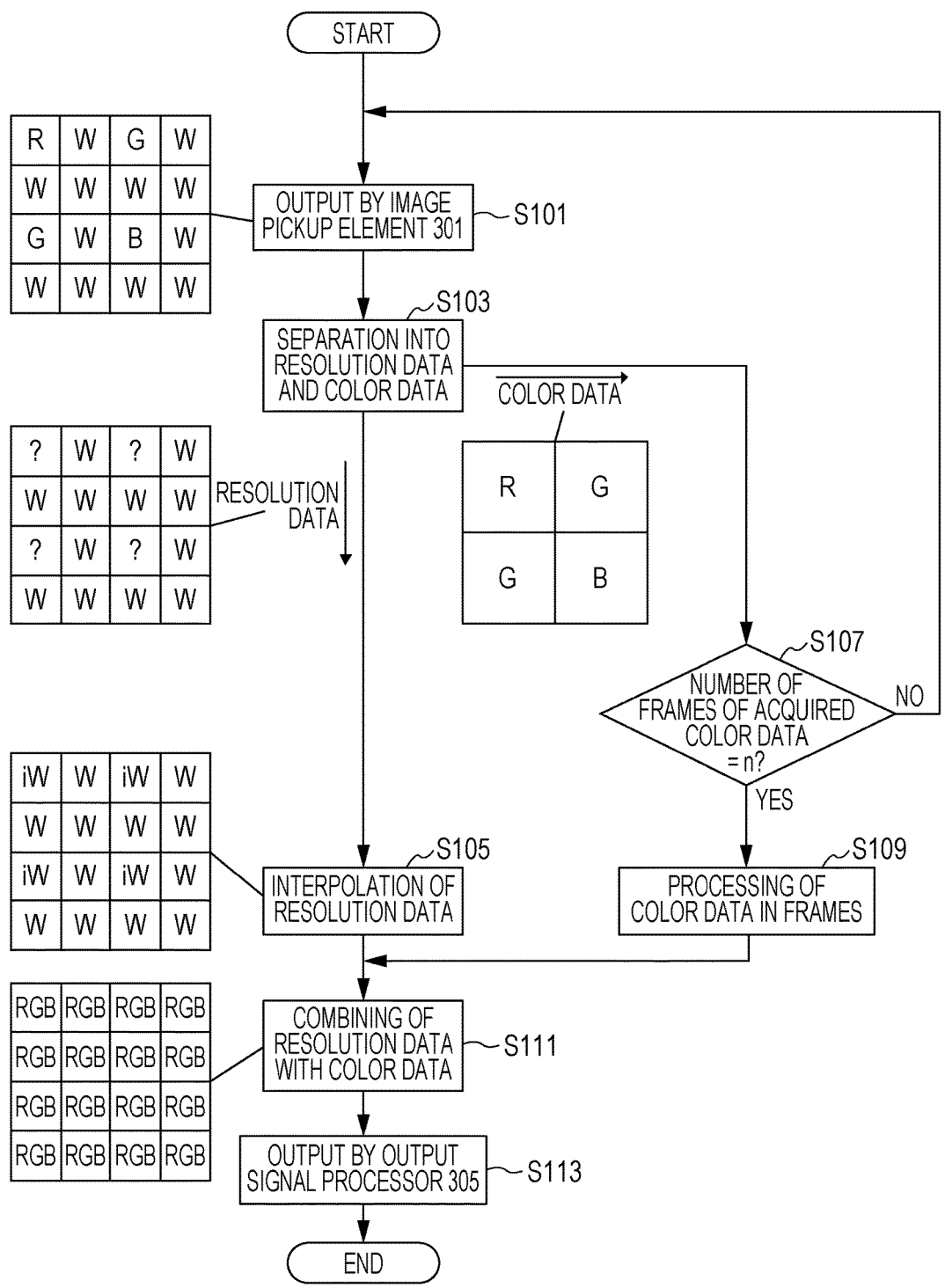
FIG. 4 illustrates an operation of the image pickup apparatus.

FIG. 4 is a flowchart illustrating an operation of the image pickup element 301 and the output signal processor 305 of the present embodiment.

In step S101, the image pickup element 301 outputs signals to the output signal processor 305.

In step S103, the output signal processor 305 separates the signals output from the image pickup element 301 into resolution data and color data on the basis of the CF array. The resolution data is data generated by signals output from W pixels, and is data representing luminance. The color data is data generated by signals output from RGB pixels. In color data, the sum of the numbers of R, G, and B pixels is a quarter of the total number of pixels. Accordingly, the resolution is half the total number of pixels in both the X and Y directions. In FIG. 4, the lowered resolution is schematically represented by the size of pixels.

In the CF array of FIG. 3B, data corresponding to white in R, G, and B pixel portions is not acquired. Accordingly, this data is indicated by "?" in FIG. 4.

In step S105, the output signal processor 305 performs interpolation on the resolution data. This interpolation is processing that compensates for signals corresponding to white in portions where R, G, and B pixels were located, on the basis of signals of adjacent W pixels. By this interpolation, a signal corresponding to white in each of R, G, and B pixels is interpolated. In FIG. 4, interpolation data for the interpolated pixels is denoted by iW. A bilinear method may be appropriately used as a method of interpolation. In the present embodiment, eight pixels surrounding iW are W pixels. Accordingly, the output of W pixels in the up/down, right/left, right diagonal, and left diagonal directions can be used as a reference interpolation value. For example, an average of two of the W pixels in the up/down, right/left, right diagonal, and left diagonal directions, the two being pixels with less variation in signal value, can be used. By using an average of W pixels with less variation in signal value, a deviation of the resulting iW from a true value of resolution data can be made smaller than that in the case where there are adjacent W pixels in only the up/down and right/left directions.

Thus, in the CF array where R, G, and B pixels are each surrounded by eight W pixels as in the present embodiment, interpolation can be performed with high accuracy.

Although details will be described in the explanation of step S111, the output signal processor 305 performs the interpolation in step S103 on signals in some of all frames containing signals output by the image pickup element 301.

In step S107, the output signal processor 305 determines whether the number of frames from which color data has been acquired reaches n, which is an integer greater than or equal to two.

If the output signal processor 305 determines NO in step S107, the process returns to step S101.

On the other hand, if the output signal processor 305 determines YES in step S107, the process proceeds to step S109.

In step S109, the output signal processor 305 processes color data contained in a plurality of frames. The processing performed in step S109 is one, or a combination, of some of the following: moving averaging, sequential cyclic processing (infinite impulse response or IIR), and nonsequential cyclic processing (finite impulse response or FIR). The processed color data is data in which color noise included in color data contained in each frame is reduced.

In step S111, the output signal processor 305 combines the resolution data with the color data processed in step S109.

This combining operation will be described. The description here is based on the assumption that the number of frames "n" of color data processed in step S109 is two.

First, signals of the first frame are output from the image pickup element 301. The output signal processor 305 does not perform the operation of step S105 on resolution data in the first frame.

The output signal processor 305 determines NO in step S107, and the process returns to step S101.

In step S101, the image pickup element 301 outputs signals of the second frame. After the operation of step S103, the output signal processor 305 performs the operation of step S105 on resolution data in the second frame. Also, the output signal processor 305 determines YES in step S107 and processes color data contained in two frames in step S109.

In step S111, the output signal processor 305 combines the processed color data contained in the two frames with the resolution data in the second frame. On the basis of the resolution data and the color data, the output signal processor 305 generates a color image. In FIG. 4, each pixel is marked with RGB. This means that data of each of the colors R, G, and B is generated for each pixel.

In step S113, the output signal processor 305 outputs the image generated in step S111.

Figure 5:
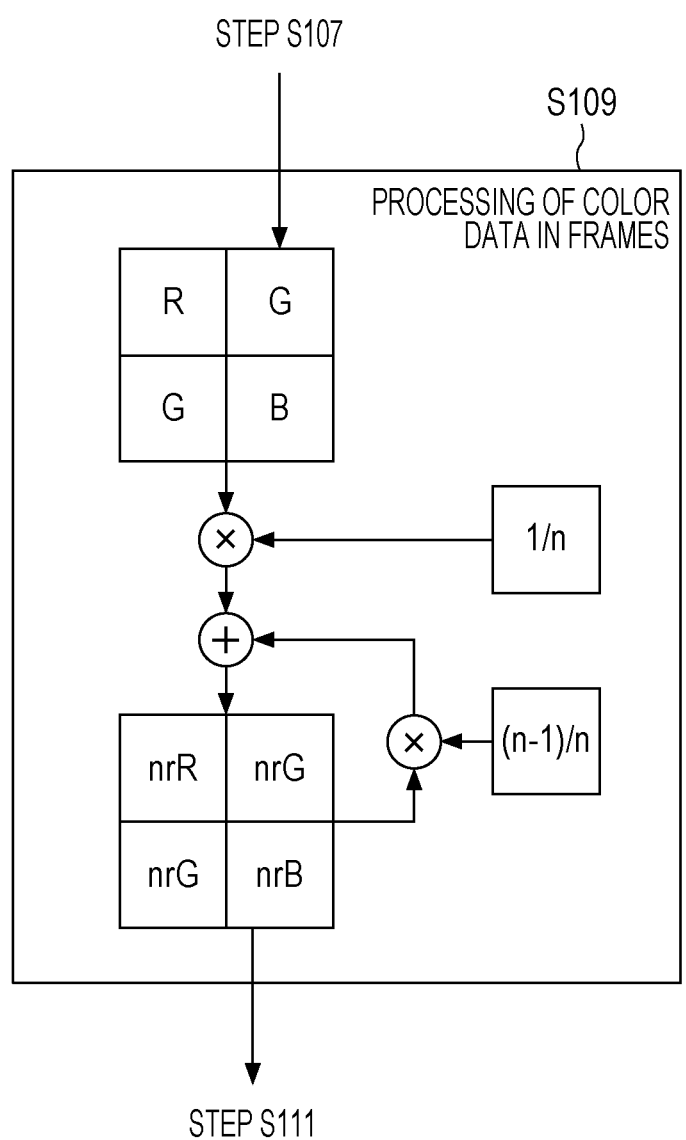
FIG. 5 illustrates an operation of the image pickup apparatus.

FIG. 5 illustrates details of the operation in step S107 described with reference to FIG. 4.

In the image pickup element of the present embodiment, the sum of the numbers of R, G, and B pixels is smaller than that in the Bayer array illustrated in FIG. 3A because of the presence of W pixels. As a result, random shot noise and photo shot noise in R, G, and B pixels are more noticeable than in the Bayer array, because of the smaller number of R, G, and B pixels. The random shot noise and photo shot noise will be collectively referred to as color noise.

To reduce the color noise, the image pickup apparatus 500 of the present embodiment performs noise reduction (NR) using color data contained in a plurality of temporally successive frames. A method of noise reduction will be described. First, color data in the first frame is stored in a frame memory in advance. Multiplication and division (described below) are not performed on the color data in the first frame.

Next, color data in the second frame will be described. As illustrated in FIG. 5, the output signal processor 305 first multiplies the color data in the second frame by a coefficient of 1/n. In the present embodiment, where n is 2, the signal value of each of R, G, and B pixels is ½. Then, the output signal processor 305 multiplies the color data in the first frame stored in a frame memory by a coefficient of (n−1)/n. Since n is 2, the signal of each of R, G, and B pixels of the color data in the first frame is ½. Then, the output signal processor 305 adds the signals multiplied by ½ in the first frame to the signals multiplied by ½ in the second frame. Thus, averaged data of the color data in the first and second frames is acquired.

If n is 3 or more, the output signal processor 305 adds signals obtained by multiplying averaged color data of color data in the first and second frames by ⅔ to color data obtained by multiplying color data contained in the third frame (which is the final frame of the three frames) by ⅓, whereby the output signal processor 305 acquires averaged data of color data contained in the three frames.

In FIG. 5, nrR, nrG, and nrB represent color data of R, G, and B pixels, respectively, obtained after noise reduction. The color data obtained after noise reduction is generated using color data contained in a plurality of frames. That is, data represented by nrR, nrG, and nrB is data with less noise components than color data contained in each frame.

The operation in step S111 will be further described. The operation in step S111 is processing that calculates interpolation data iW for signals corresponding to white in pixels where R, G, and B pixels are arranged, and an RGB color ratio of nrR, nrG, and nrB of the pixels. A value obtained by multiplying the color ratio by data W or interpolation data iW of each pixel is an RGB value of the pixel. This will be specifically explained by the following equations.

When pixels to be processed are W pixels:

$$RGB = \left[ \frac{nrR}{iWr}W \quad \frac{nrG}{iWg}W \quad \frac{nrB}{iWb}W \right] \quad \text{Equation 1}$$

When pixels to be processed are R, G, and B pixels:

$$RGB = \left[ \frac{nrR}{iWr}iW \quad \frac{nrG}{iWg}iW \quad \frac{nrB}{iWb}iW \right] \quad \text{Equation 2}$$

Note that iWr, iWg, and iWb are iW values for R, G, and B pixel portions, respectively. Another processing method may be to normalize color data. This will be explained by the following equations.

When pixels to be processed are W pixels:

$$RGB = \left[ \frac{nrR}{nrR+nrG+nrB}W \quad \frac{nrG}{nrR+nrG+nrB}W \quad \frac{nrB}{nrR+nrG+nrB}W \right] \quad \text{Equation 3}$$

When pixels to be processed are R, G, and B pixels:

$$RGB = \left[ \frac{nrR}{nrR+nrG+nrB} iW \quad \frac{nrG}{nrR+nrG+nrB} iW \quad \frac{nrB}{nrR+nrG+nrB} iW \right]$$

Equation 4

In the equations described above, nrR, nrG, and nrB are normalized by (nrR+nrG+nrB). Accordingly, the value of each of nrR/(nrR+nrG+nrB), nrG/(nrR+nrG+nrB), and nrB/(nrR+nrG+nrB) is normalized color data.

Data W and interpolation data iW are resolution data. The resolution data responds more quickly to the motion of the object than color data obtained by averaging signals in a plurality of frames. On the other hand, color data (nrR, nrG, nrB) is data with reduced noise components.

The color data (nrR, nrG, nrB) is data that responds more slowly to the motion of the object than resolution data. However, the sensitivity of the human eye to spatial changes within a frame and temporal changes between frames is lower for the color data than for the resolution data. Accordingly, the low responsiveness of the color data is more permissible than that of the resolution data.

Therefore, if the resolution data quickly responds to the motion of the object, the output signal processor 305 can generate a good RGB image using the resolution data and the color data obtained by averaging signals in a plurality of frames.

Thus, by combining the resolution data and the color data together, an image with reduced noise components and good responsiveness to the motion of the object can be obtained.

Evaluative photographing was performed using the image pickup apparatus 500 of the present embodiment and other image pickup apparatuses. FIG. 6 shows conditions and results of the evaluative photographing. Images were evaluated in terms of noise and afterimages. The noise evaluation and the afterimage evaluation in FIG. 6 are on a scale of A to C, with A being the best.

As conditions for the evaluative photographing, the brightness in the photographing environment and the value of n (which is the number of frames for averaging of color data) in the above-described coefficients, 1/n and (n−1)/n, were varies for evaluation.

As Condition No. 1, the brightness in the photographing scene was set to 10 lux and the number "n" of frames for averaging of color data was set to 1 (n=1). An image photographed under this condition had very little noise and produced no afterimage. Accordingly, the noise and the afterimage were both evaluated as A.

As Condition No. 2, the brightness in the photographing scene was set to 10 lux and n was set to 4 (n=4). An image photographed under this condition had very little noise. Unlike under Condition No. 1 where n=1, an afterimage with blurred colors was seen in some parts because of n=4, but this was within an allowable range. Accordingly, the noise and the afterimage were evaluated as A and B, respectively.

As Condition No. 3, the brightness in the photographing scene was set to 1 lux and n was set to 1 (n=1). An image photographed under this condition had slight noise due to a reduction in the S/N ratio of resolution data and color data, caused by a decrease in the amount of light in the photographing scene. No afterimage was seen in the image photographed under this condition. Accordingly, the noise and the afterimage were evaluated as B and A, respectively.

As Condition No. 4, the brightness in the photographing scene was set to 1 lux and n was set to 4 (n=4). Under this condition, an image with less noise than the image photographed under Condition No. 3 was obtained by averaging color data in a plurality of frames. The degree of afterimage was the same as that in the image photographed under Condition No. 2, and thus was within an allowable range. Accordingly, the noise and the afterimage were evaluated as A and B, respectively.

As Condition No. 5, the brightness in the photographing scene was set to 0.1 lux and n was set to 1 (n=1). Under this condition, the S/N ratio of resolution data and color data was further reduced as compared to that under Condition No. 3, and an image with noticeable noise was photographed. No afterimage was seen because of n=1. Accordingly, the noise and the afterimage were evaluated as C and A, respectively.

As Condition No. 6, the brightness in the photographing scene was set to 0.1 lux and n was set to 4 (n=4). Under this condition, an image with less noise than the image photographed under Condition No. 5 was obtained by averaging color data in a plurality of frames. Although the number "n" of frames for processing of color data was set to 4 (n=4), afterimage feeling was at an allowable level. Accordingly, in Condition No. 6, the noise and the afterimage were both evaluated as B.

Thus, by averaging color data contained in a plurality of frames, the image pickup apparatus 500 of the present embodiment can generate an image with reduced afterimage while reducing the level of noise.

The image pickup apparatus 500 of the present embodiment generates image data using RGB pixel data contained in n frames and W pixel data contained in m frames, where m is smaller than n. The value of n is preferably a number greater than or equal to 1/X, where X is the ratio of the number of W pixels to the number of all pixels on which light is incident. Thus, the occurrence of false colors which increases as the number of W pixels increases can be reduced.

The image pickup apparatus 500 of the present embodiment may appropriately change the value of n in accordance with the environment of the object, such as the brightness, contrast, or the speed of motion.

In the image pickup apparatus 500 of the present embodiment, the number of R, G, and B pixels is smaller than that in the Bayer array because of the presence of W pixels. Therefore, in an image generated by the image pickup apparatus 500 of the present embodiment, moiré may occur more often than in an image generated using signals output by an image pickup element with the Bayer array. In this case, in the operation of step S111, the following operation may be further performed on the RGB value of each pixel obtained by the operation described above.

To generate an RGB image by the operation of step S111, R'G'B' data obtained by the following equation is used:

$$R'G'B' = \left[ \frac{R}{iWr} \quad \frac{G}{iWg} \quad \frac{B}{iWb} \right]$$

Equation 5 where iWr, iWg, and iWb represent interpolation data iW for interpolating R, G, and B pixels, respectively. The R'G'B' data is obtained by dividing the signal value of an R pixel by interpolation data iW based on eight W pixels surrounding the R pixel. An image with reduced moiré can thus be obtained.

In the present embodiment, the resolution data is formed by signals of only W pixels, and the color data is formed by signals of only R, G, and B pixels. The present disclosure is not limited to this example. The signals forming the resolution data may include the signals of R, G, and B pixels, as long as the resolution data is mainly formed by the signals of W pixels. Also, the signals forming the color data may include the signals of W pixels, as long as the color data is mainly formed by the signals of R, G, and B pixels.

Although color filters of R, G, and B colors have been described as an example in the present embodiment, the color filters may be of cyan, magenta, and yellow colors, instead of R, G, and B. Even in this case, the same operation as that described in the present embodiment can be performed using pixels having color filters of cyan, magenta, and yellow colors and W pixels.

In the present embodiment, the image pickup element outputs color data and resolution data in one frame. Alternatively, the image pickup element may output color data in one frame and resolution data in another frame.

In the present embodiment, the output signal processor 305 of the image pickup apparatus 500 generates image data using RGB pixel data contained in n frames and W pixel data contained in m frames, where m is smaller than n. The present disclosure is not limited to this. For example, a program delivered via a recording medium, such as a CD-ROM or DVD-ROM, or a communication network may include a signal processing method that generates image data using RGB pixel data contained in n frames and W pixel data contained in m frames, where m is smaller than n. Thus, a computer on which the program is installed can perform the signal processing method that generates image data using RGB pixel data contained in n frames and W pixel data contained in m frames, where m is smaller than n.

Second Embodiment

An image pickup apparatus of the present embodiment will be described, with a focus on the differences from the image pickup apparatus 500 of the first embodiment. The image pickup apparatus 500 of the present embodiment generates an image using color data obtained by processing color data contained in a plurality of frames and resolution data obtained by processing resolution data contained in a smaller number of frames than those for the processing of color data. The configuration of the image pickup apparatus 500 of the present embodiment is the same as that of the image pickup apparatus 500 illustrated in FIG. 1.

Figure 7:
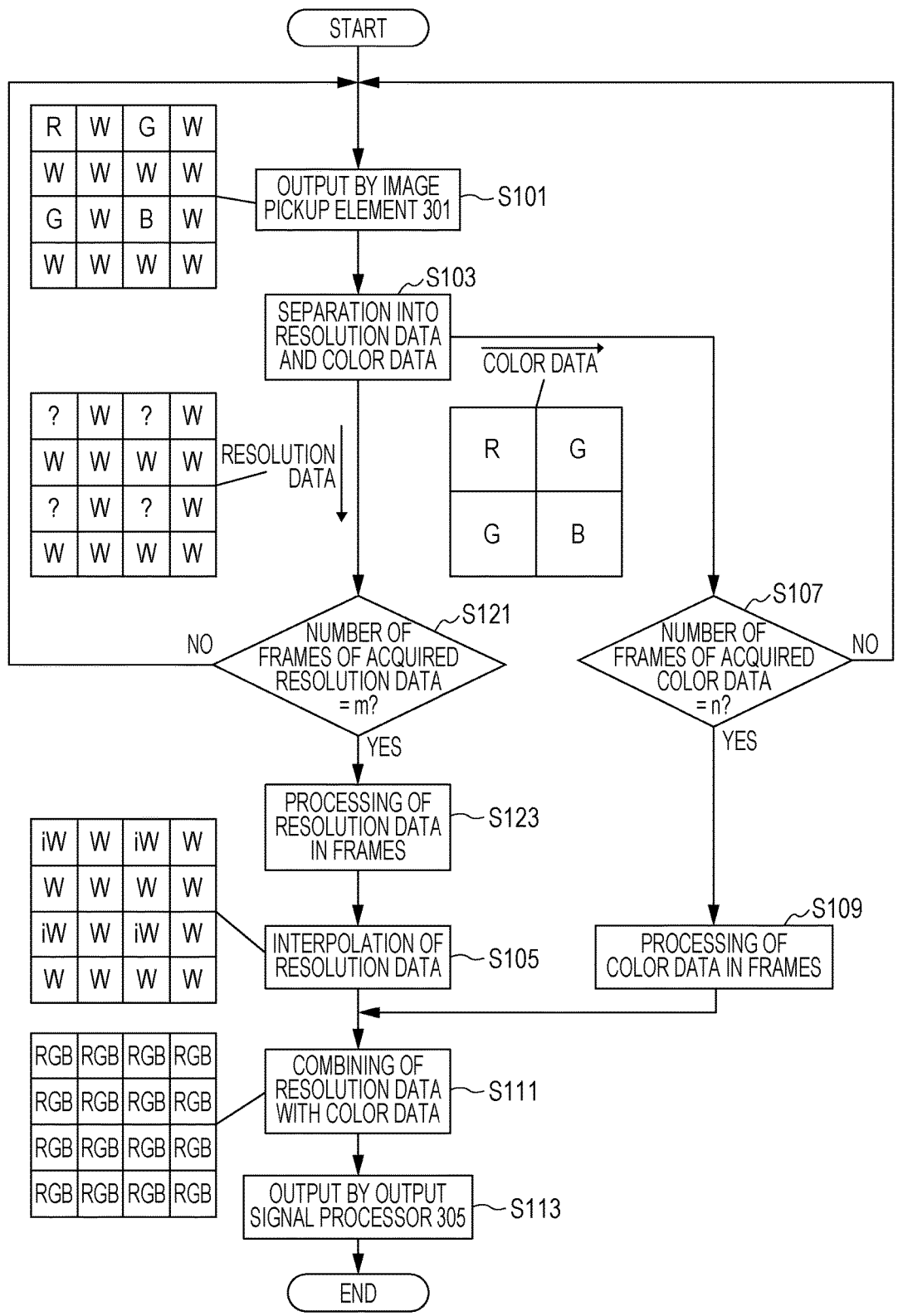
FIG. 7 illustrates an operation of an image pickup apparatus.

FIG. 7 is a flowchart illustrating an operation of the image pickup apparatus 500 of the present embodiment. In FIG. 7, the same operations as those illustrated in FIG. 4 are denoted by the same reference numerals as those in FIG. 4.

The output signal processor 305 separates signals output from the image pickup element 301 into resolution data and color data. Then, for the resolution data, the output signal processor 305 generates resolution data by processing resolution data contained in m frames. For the color data, the output signal processor 305 generates color data by processing color data contained in n frames, where n is greater than m.

For the human eye, it is more difficult to perceive an afterimage of colors than an afterimage of resolution. Accordingly, the number of frames for processing of resolution data used for generating an image is smaller than the number of frames for processing of color data. Thus, the image pickup apparatus 500 of the present embodiment can generate an image with reduced noise while making an afterimage appearing in the image difficult for the human eye to perceive.

FIG. 8 shows evaluations according to the present embodiment. The noise evaluation and the afterimage evaluation in FIG. 8 are on a scale of A to D, with A being the best.

As Condition No. 1, the brightness in the photographing scene was set to 10 lux, and m and n were both set to 1 (m=1, n=1). The noise and the afterimage of an image photographed under this condition were both evaluated as A.

As Condition No. 2, the brightness in the photographing scene was set to 1 lux, and m and n were set to 1 and 4, respectively (m=1, n=4). The noise and the afterimage of an image photographed under this condition were evaluated as A and B, respectively.

As Condition No. 3, the brightness in the photographing scene was set to 1 lux, and m and n were set to 2 and 4, respectively (m=2, n=4). The noise and the afterimage of an image photographed under this condition were evaluated as A and C, respectively. As compared to the image obtained under Condition No. 2, the degree of afterimage in the image obtained under Condition No. 3 was increased within an allowable range.

As Condition No. 4, the brightness in the photographing scene was set to 0.1 lux, and m and n were both set to 1 (m=1, n=1). The noise and the afterimage of an image photographed under this condition were evaluated as D and A, respectively.

As Condition No. 5, the brightness in the photographing scene was set to 0.1 lux, and m and n were set to 1 and 4, respectively (m=1, n=4). The noise and the afterimage of an image photographed under this condition were evaluated as C and B, respectively. As compared to the image photographed under Condition No. 4, the degree of afterimage was increased within an allowable range and the level of noise was reduced, in the image photographed under Condition No. 5.

As Condition No. 6, the brightness in the photographing scene was set to 0.1 lux, and m and n were set to 2 and 4, respectively (m=2, n=4). The noise and the afterimage of an image photographed under this condition were evaluated as B and C, respectively. As compared to the image photographed under Condition No. 5, the degree of afterimage was increased within an allowable range and the level of noise was reduced, in the image photographed under Condition No. 6.

As Condition No. 7, the brightness in the photographing scene was set to 0.01 lux, and m and n were set to 1 and 4, respectively (m=1, n=4). The noise and the afterimage of an image photographed under this condition were evaluated as D and B, respectively.

As Condition No. 8, the brightness in the photographing scene was set to 0.01 lux, and m and n were set to 2 and 4, respectively (m=2, n=4). The noise and the afterimage of an image photographed under this condition were both evaluated as C. As compared to the image photographed under Condition No. 7, the degree of afterimage was increased within an allowable range and the level of noise was reduced, in the image photographed under Condition No. 8.

As Condition No. 9, the brightness in the photographing scene was set to 0.01 lux, and m and n were both set to 4 (m=4, n=4). The noise and the afterimage of an image photographed under this condition were evaluated as B and D, respectively. As compared to the image photographed under Condition No. 8, the level of noise was reduced and the degree of afterimage was increased beyond an allowable limit in the image photographed under Condition No. 9.

As can be seen from the comparison between, for example, Conditions Nos. 5 and 6, the image pickup apparatus 500 of the present embodiment can generate an image with reduced noise using resolution data obtained by processing resolution data contained in a plurality of frames. Under Condition No. 9 where resolution data and color data used to generate an image were equal in the number of frames, the degree of afterimage was increased beyond an allowable limit. In the image pickup apparatus 500 of the present embodiment, the number of frames of resolution data used to generate an image is made smaller than the number of frames of color data, so that the image pickup apparatus 500 can generate an image with reduced noise while reducing an increase in the degree of afterimage.

When resolution data obtained by processing resolution data contained in a plurality of frames is used to generate an image, the degree of afterimage may be increased. Therefore, when the object is at rest, color data in n1 frames and resolution data in m1 frames are used to generate an image, where m1 is smaller than n1. On the other hand, when the object is in motion, resolution data in a smaller number of frames than that when the object is at rest may be used to generate an image. When the object is in motion, resolution data contained in only one frame may be preferably used to generate an image.

Although color filters of R, G, and B colors have been described as an example in the present embodiment, the color filters may be of cyan, magenta, and yellow colors, instead of R, G, and B. Even in this case, the same operation as that described in the present embodiment can be performed using pixels having color filters of cyan, magenta, and yellow colors and W pixels.

Third Embodiment

An image pickup apparatus of the present embodiment will be described, with a focus on the differences from the image pickup apparatus 500 of the first embodiment. The present embodiment uses a CF array illustrated in FIG. 9. This array is denoted by RGBW8. In the RGBW8 array, the ratio of the number of W pixels to the total number of pixels is lower than that in the RGBW12 array. Accordingly, the sensitivity of the image pickup element with the RGBW8 array is lower than that of the image pickup element with the RGBW12 array. In the RGBW8 array, unlike in the RGBW12 array, any of R, G, and B pixels is adjacent to each W pixel in the up/down and right/left directions in plan view. This has the effect of reducing the occurrence of false colors.

Figure 10:
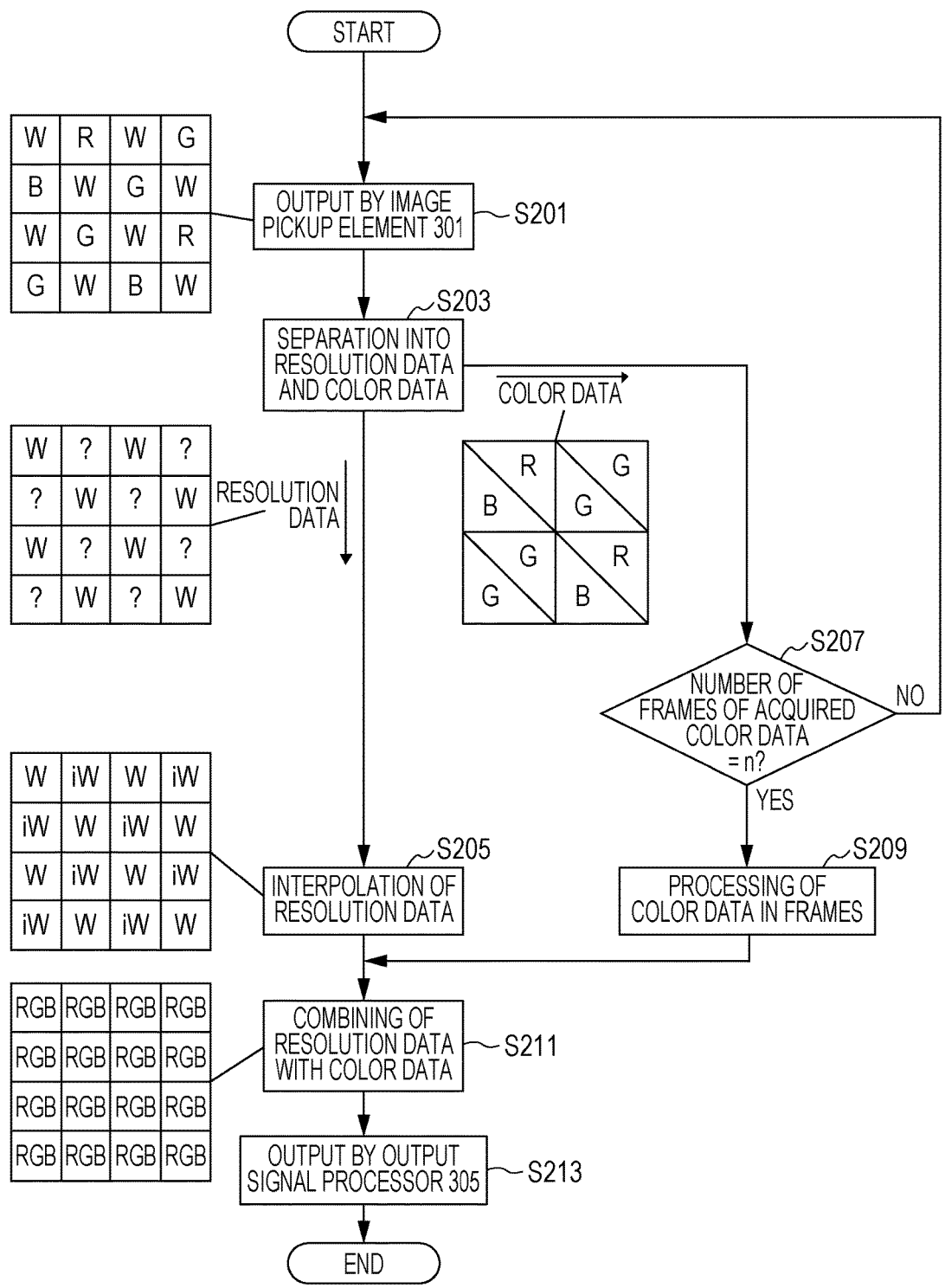
FIG. 10 illustrates an operation of an image pickup apparatus.

FIG. 10 is a flowchart illustrating an operation of the image pickup apparatus 500 of the present embodiment.

In step S201, the image pickup element 301 outputs signals to the output signal processor 305.

In step S203, the output signal processor 305 separates the signals output from the image pickup element 301 into resolution data and color data on the basis of the CF array.

In the CF array of FIG. 9, data corresponding to white in R, G, and B pixel portions is not acquired. Accordingly, this data is indicated by "?" in FIG. 10.

In step S205, the output signal processor 305 performs interpolation on the resolution data. This interpolation is processing that compensates for signals corresponding to white in portions where R, G, and B pixels were located, on the basis of signals of adjacent W pixels. By this interpolation, a signal corresponding to white in each of R, G, and B pixels is interpolated. In FIG. 10, interpolation data for the interpolated pixels is denoted by iW. A bilinear method may be appropriately used as a method of interpolation. In the present embodiment, four pixels surrounding iW are W pixels. Accordingly, the output of W pixels adjacent in the up/down and right/left directions can be used as a reference interpolation value. For example, an average of two of the W pixels in the up/down and right/left directions, the two being pixels with less variation in signal value, can be used.

In step S207, the output signal processor 305 determines whether the number of frames from which color data has been acquired reaches n, which is an integer greater than or equal to two.

If the output signal processor 305 determines NO in step S207, the process returns to step S201.

On the other hand, if the output signal processor 305 determines YES in step S207, the process proceeds to step S209.

In step S209, the output signal processor 305 processes color data contained in a plurality of frames. The processing performed in step S209 can be the same as that in step S109 described above with reference to FIG. 4.

In step S211, the output signal processor 305 combines the resolution data with the color data processed in step S209.

In step S213, the output signal processor 305 outputs an image generated in step S211.

Figure 11:
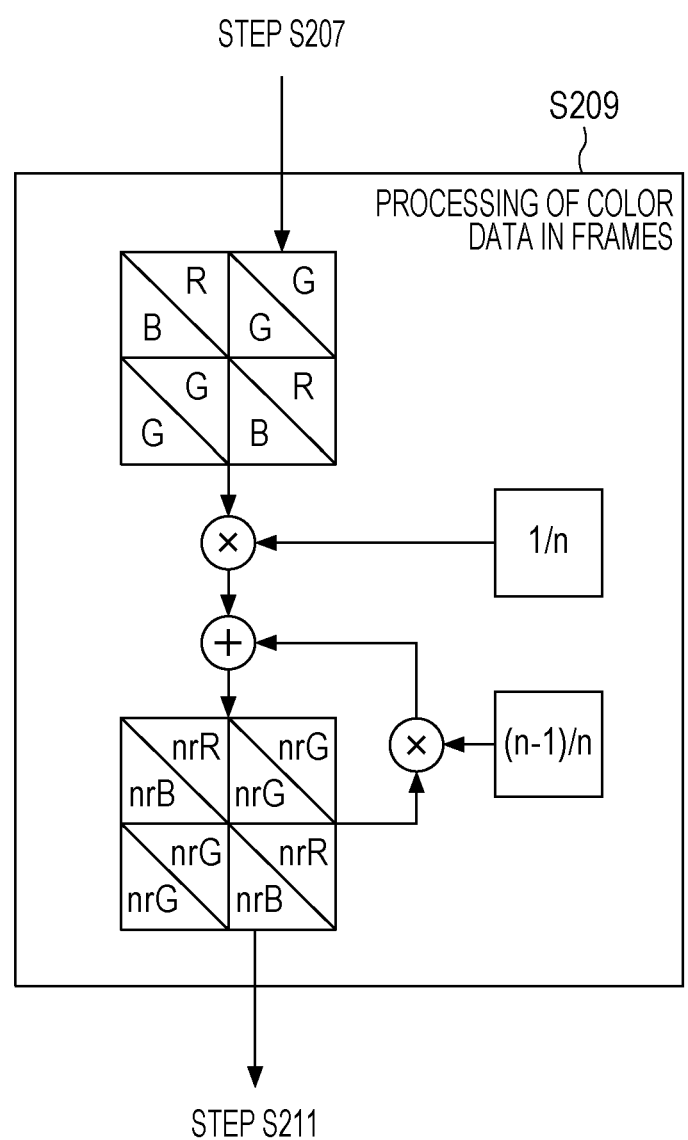
FIG. 11 illustrates an operation of the image pickup apparatus.

FIG. 11 illustrates details of the operation in step S207 described with reference to FIG. 10.

The operation of the image pickup apparatus 500 of the present embodiment illustrated in FIG. 11 is the same as the operation illustrated in FIG. 5, except that there is a difference in the number of pixels of color data because of the difference in CF array between them.

By using the image pickup apparatus 500 that performs the operation described above, evaluative photographing was performed under the same conditions as those shown in FIG. 6. Because the ratio of W pixels to all pixels is lower than that in the image pickup apparatus 500 of the first embodiment, the sensitivity and resolution of an image were degraded. However, as compared to the case of generating an image using resolution data contained in one frame and color data contained in one frame, the image pickup apparatus 500 of the present embodiment was able to generate an image with reduced noise while reducing afterimages.

Although color filters of R, G, and B colors have been described as an example in the present embodiment, the color filters may be of cyan, magenta, and yellow colors, instead of R, G, and B. Even in this case, the same operation as that described in the present embodiment can be performed using pixels having color filters of cyan, magenta, and yellow colors and W pixels.

Fourth Embodiment

An image pickup apparatus of the present embodiment will be described, with a focus on the differences from the first embodiment.

FIG. 12 illustrates a CF array of the image pickup element 301 of the present embodiment. This CF array is denoted by RGBG12.

The CF array in the image pickup element 301 of the present embodiment is obtained by replacing W pixels in the RGBW12 array with G pixels. Replacing the W pixels with the G pixels lowers the sensitivity of RGBW12. In photographing of an object with a large amount of light, W pixels in the RGBW12 array may be saturated, and this may lower the gradation of an image. On the other hand, in the RGBG12 array, since the sensitivity of G pixels is lower than that of W pixels, the G pixels may not be saturated even in a photographing scene where W pixels are saturated. Thus, the image pickup apparatus 500 of the present embodiment can generate an image with less reduction in gradation even in a photographing scene where W pixels are saturated.

Figure 13:
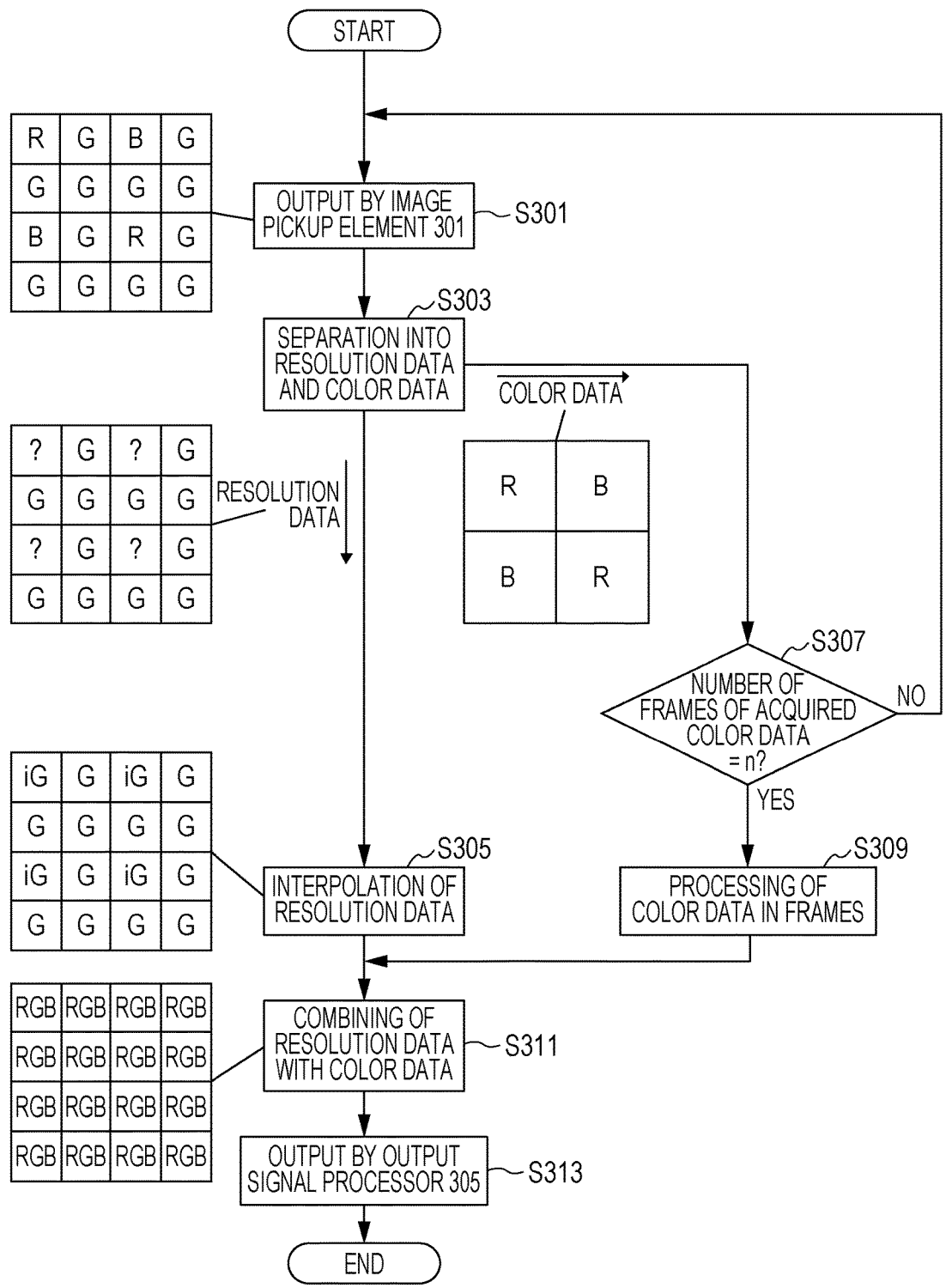
FIG. 13 illustrates an operation of an image pickup apparatus.

FIG. 13 is a flowchart illustrating an operation of the image pickup apparatus 500 of the present embodiment.

In step S301, the image pickup element 301 outputs signals to the output signal processor 305.

In step S303, the output signal processor 305 separates the signals output from the image pickup element 301 into resolution data and color data on the basis of the CF array.

In the CF array of FIG. 12, data corresponding to G pixels in R and B pixel portions is not acquired. Accordingly, in the resolution data using the G pixels in FIG. 12, R and B pixels are indicated by "?".

In step S305, the output signal processor 305 performs interpolation on the resolution data. This interpolation is processing that compensates for signals corresponding to G pixels in portions where R and B pixels were located, on the basis of signals of adjacent G pixels. By this interpolation, a signal corresponding to a G pixel in each of R and B pixels is interpolated. In FIG. 13, interpolation data for the interpolated pixels is denoted by iG. A bilinear method may be appropriately used as a method of interpolation.

In step S307, the output signal processor 305 determines whether the number of frames from which color data has been acquired reaches n, which is an integer greater than or equal to two.

If the output signal processor 305 determines NO in step S307, the process returns to step S301.

On the other hand, if the output signal processor 305 determines YES in step S307, the process proceeds to step S309.

The operation in step S307 described with reference to FIG. 13 is the same as the operation illustrated in FIG. 5.

In step S309, the output signal processor 305 processes color data contained in a plurality of frames. The processing performed in step S309 can be the same as that in step S109 described above with reference to FIG. 4.

In step S311, the output signal processor 305 combines the resolution data with the color data processed in step S309.

In step S311, the output signal processor 305 performs the following operation on the resolution data obtained by the interpolation in step S305 and the color data in the plurality of frames processed in step S309.

The output signal processor 305 obtains a ratio between interpolation data iGr corresponding to a G pixel in a pixel where an R pixel is located and nrR of color data in the pixel. For the G pixel the ratio is multiplied by data G, whereas for the R pixel the ratio is multiplied by interpolation data iG.

Also, the output signal processor 305 obtains a ratio between interpolation data iGb corresponding to a G pixel in a pixel where a B pixel is located and nrB of color data in the pixel. For the G pixel the ratio is multiplied by data G, whereas for the B pixel the ratio is multiplied by interpolation data iG.

In summary, a computation for obtaining an RGB image by combining resolution data with color data is represented by the following equations.

When pixels to be processed are G pixels:

$$RGB = \left[\frac{nrR}{nrR + nrB} G \; G \; \frac{nrB}{nrR + nrB} G\right] \quad \text{Equation 6}$$

When pixels to be processed are R and B pixels:

$$RGB = \left[\frac{nrR}{nrR + nrB} iG \; iG \; \frac{nrB}{nrR + nrB} iG\right] \quad \text{Equation 7}$$

In the image pickup element 301 of the present embodiment, the ratios of R and B pixels to all pixels are lower than those in the Bayer array. Therefore, the output signal processor 305 further performs the operation described below.

When pixels to be processed are G pixels:

$$R'G'B' = \left[\frac{R}{iGr} G \; G \; \frac{B}{iGb} G\right] \quad \text{Equation 8}$$

When pixels to be processed are R and B pixels:

$$R'G'B' = \left[\frac{R}{iGr} iG \; iG \; \frac{B}{iGb} iG\right] \quad \text{Equation 9}$$

Evaluative photographing was performed using the image pickup apparatus 500 that performs the operation described above. As a result of the photographing, color noise in a low light environment can be reduced as compared to using the image pickup element with the Bayer array.

In the present embodiment, R data is normalized with iGr and B data is normalized with iGb. Thus, a value obtained by division by luminance (iGr) to be realized in an R pixel and a value obtained by division by luminance (iGb) to be realized in a B pixel are used for computations of R/iGr and B/iGb, whereby moiré that occurs in R and B pixels can be reduced.

In step S313, the output signal processor 305 outputs an image generated in step S311.

By using the image pickup apparatus 500 that performs the operation described above, evaluative photographing was performed under the same conditions as those shown in FIG. 6. Since the image pickup element 301 includes no W pixels, the sensitivity and resolution of an image generated by the image pickup apparatus 500 of the present embodiment were lower than those of the image obtained by the image pickup apparatus 500 of the first embodiment. However, as compared to the case of generating an image using resolution data contained in one frame and color data contained in one frame, the image pickup apparatus 500 of the present embodiment was able to generate an image with reduced noise while reducing afterimages.

Although color filters of R, G, and B colors have been described as an example in the present embodiment, the color filters may be of cyan, magenta, and yellow colors, instead of R, G, and B. Even in this case, the same operation as that described in the present embodiment can be performed using pixels having color filters of cyan, magenta, and yellow colors and W pixels.

The image pickup apparatus 500 of the present embodiment generates image data using RB pixel data contained in n frames and G pixel data contained in m frames, where m is smaller than n. The value of n is preferably a number greater than or equal to 1/X, where X is the ratio of the number of G pixels to the number of all pixels on which light is incident. Thus, the occurrence of false colors which increases as the number of G pixels increases can be reduced.

Fifth Embodiment

An image pickup apparatus of the present embodiment will be described, with a focus on the differences from the fourth embodiment.

The CF array of the image pickup element 301 of the present embodiment is the Bayer array illustrated in FIG. 3A.

Figure 14:
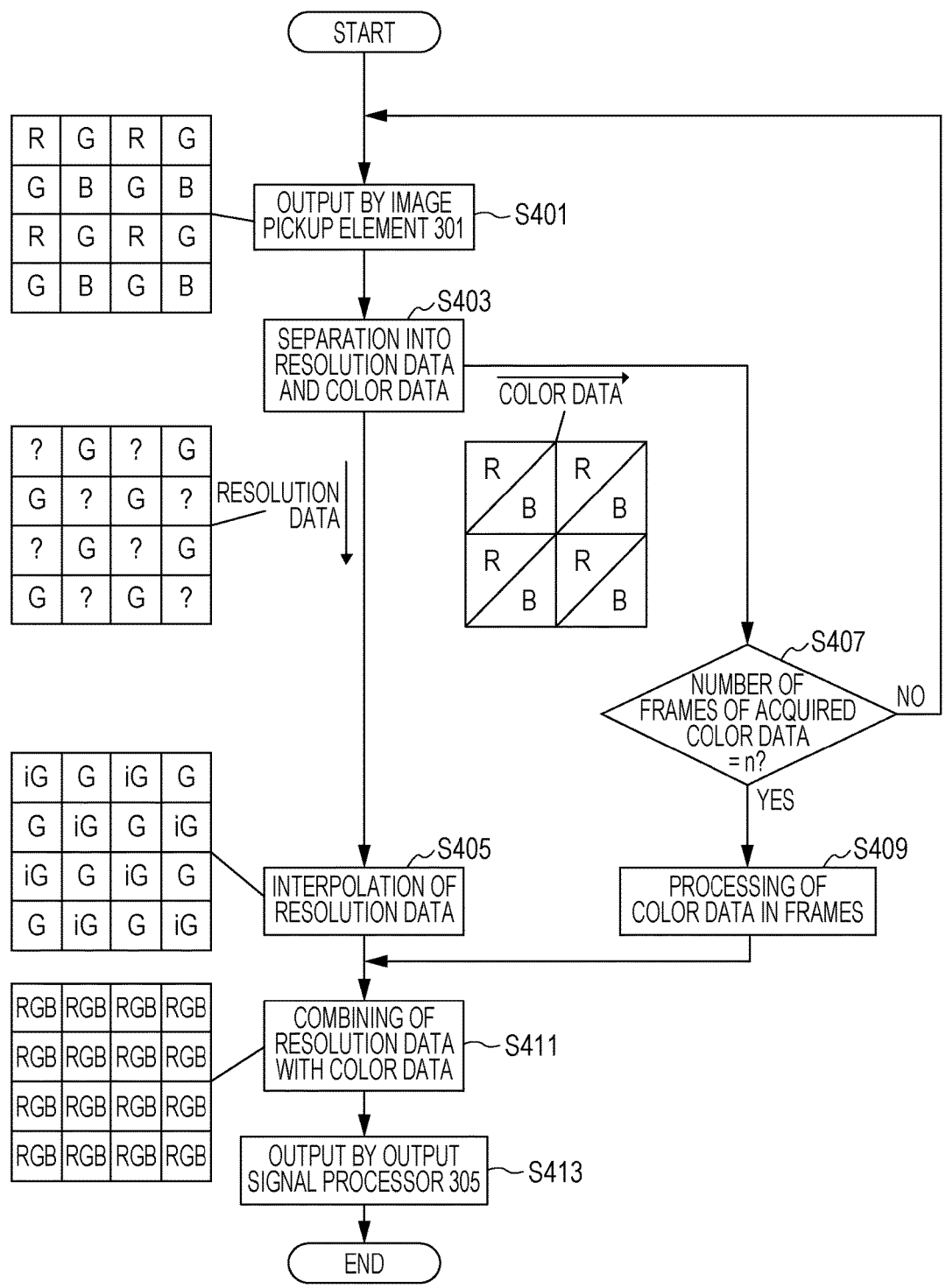
FIG. 14 illustrates an operation of an image pickup apparatus.

FIG. 14 is a flowchart illustrating an operation of the image pickup apparatus 500 of the present embodiment.

In step S401, the image pickup element 301 outputs signals to the output signal processor 305.

In step S403, the output signal processor 305 separates the signals output from the image pickup element 301 into resolution data and color data on the basis of the CF array.

In the CF array of FIG. 3A, data corresponding to G pixels in R and B pixel portions is not acquired. Accordingly, in the resolution data using the G pixels in FIG. 3A, R and B pixels are indicated by "?".

In step S405, the output signal processor 305 performs interpolation on the resolution data. This interpolation is processing that compensates for signals corresponding to G pixels in portions where R and B pixels were located, on the basis of signals of adjacent G pixels. By this interpolation, a signal corresponding to a G pixel in each of R and B pixels is interpolated. In FIG. 14, interpolation data for the interpolated pixels is denoted by iG. A bilinear method may be appropriately used as a method of interpolation.

In step S407, the output signal processor 305 determines whether the number of frames from which color data has been acquired reaches n, which is an integer greater than or equal to two.

If the output signal processor 305 determines NO in step S407, the process returns to step S401.

On the other hand, if the output signal processor 305 determines YES in step S407, the process proceeds to step S409.

In step S409, the output signal processor 305 processes color data contained in a plurality of frames. The processing performed in step S409 can be the same as that in step S209 described above with reference to FIG. 11.

In step S411, the output signal processor 305 combines the resolution data with the color data processed in step S409.

In step S413, the output signal processor 305 outputs an image generated in step S411.

The combining operation in step S411 is the same as the operation of obtaining RGB data for each pixel described in the fourth embodiment.

By using the image pickup apparatus 500 that performs the operation described above, evaluative photographing was performed under the same conditions as those shown in FIG. 6. Since the image pickup element 301 includes no W pixels, the sensitivity and resolution of an image generated by the image pickup apparatus 500 of the present embodiment were lower than those of the image obtained by the image pickup apparatus 500 of the first embodiment. However, as compared to the case of generating an image using resolution data contained in one frame and color data contained in one frame, the image pickup apparatus 500 of the present embodiment was able to generate an image with reduced noise while reducing afterimages.

Although color filters of R, G, and B colors have been described as an example in the present embodiment, the color filters may be of cyan, magenta, and yellow colors, instead of R, G, and B. Even in this case, the same operation as that described in the present embodiment can be performed using pixels having color filters of cyan, magenta, and yellow colors and W pixels.

The present disclosure can provide an image pickup apparatus that generates an image with reduced color noise.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from International Patent Application No. PCT/JP2014/084608, filed Dec. 26, 2014, which is hereby incorporated by reference herein in its entirety.

The invention claimed is:

1. A method for driving an image pickup apparatus that includes an image pickup element and an output signal processor, the image pickup element having a plurality of color pixels, each having a color filter of one of red, green, and blue, and a white pixel, the method comprising:
   outputting, from the image pickup element to the output signal processor, signals output by a first color pixel of the plurality of color pixels in n frames where each frame of the n frames is output from the image pickup element at a different time and n is an integer greater than two, and signals output by the white pixel in m frames, where each frame of the m frames is output at a different time from the image pickup element and m is an integer smaller than n; and
   generating, by the output signal processor, image data using the signals output by the first color pixel contained in the n frames, and the signals of the white pixel contained in the m frames,
   wherein the output signal processor generates image data using a signal obtained by averaging the signals output by the first color pixel contained in the n frames and a signal obtained by averaging signals of the white pixels contained in the m frame.

2. The method for driving the image pickup apparatus according to claim 1, wherein n is a number greater than or equal to 1/X, where X is a ratio of the number of the white pixels to the number of all pixels on which light is incident in the image pickup element.

3. The method for driving the image pickup apparatus according to claim 1, wherein the output signal processor generates image data using the signal obtained by averaging the signals output by the first color pixel contained in the n frames and the signal of the white pixels contained in a final frame of the n frames.

4. The method for driving the image pickup apparatus according to claim 1, wherein the image pickup element includes a plurality of white pixels; and
   each of the color pixels is adjacent to white pixels in all of up/down, right/left, and diagonal directions in plan view.

5. The method for driving the image pickup apparatus according to claim 1,
   wherein a step of the outputting includes that the image pickup element outputs, to the output signal processor, signals output by the plurality of color pixels and a signal output by the white pixel in a first frame within the m frames,
   wherein the method further includes generating, by the output signal processor, resolution data using the signal of the white pixel in the first frame, and generating, by the output signal processor, color data using the signal of the plurality of color pixels in the first frame.

6. The image pickup apparatus according to claim 1,
   wherein, in generating the image data, the output signal processor does not perform processing on signals output by the plurality of color pixels contained in a first frame of the n frames.

7. A method for driving an image pickup apparatus that includes an image pickup element and an output signal processor, the image pickup element having a plurality of color pixels, each having a color filter of one of red, green, and blue, the method comprising:
- outputting, from the image pickup element to the output signal processor, signals output by a first color pixel having the color filter of red or blue in n frames, where each frame of the n frames is output from the image pickup element at a different time and n is an integer greater than two; and
- generating, by the output signal processor, image data using signals output by the first color pixel contained in the n frames, and signals output by the second color pixel contained in m frames,
- wherein the output signal processor generates image data using a signal obtained by averaging the signals output by the first color pixel contained in the n frames and a signal obtained by averaging signals of the white pixels contained in the m frame.

8. The method for driving the image pickup apparatus according to claim 7, wherein n is a number greater than or equal to 1/X, where X is a ratio of the number of the pixels having the second color pixel to the number of all pixels on which light is incident in the image pickup element.

9. The method for driving the image pickup apparatus according to claim 7, wherein the output signal processor generates image data using the signal obtained by averaging the signals output by the first color pixel contained in the n frames and the signal of the second color pixel contained in a final frame of the n frames.

10. The method for driving the image pickup apparatus according to claim 7, wherein the pixels having the color filters of red and blue are each adjacent to pixels having the color filters of green in all of up/down, right/left, and diagonal directions in plan view.

11. The method for driving the image pickup apparatus according to claim 7,
- wherein a step of the outputting includes that the image pickup element outputs, to the output signal processor, signals output by the plurality of color pixels in a first frame within the m frames,
- wherein the method further includes
- generating, by the output signal processor, resolution data using the signal of the pixel having the color filter of green in the first frame, and
- generating, by the output signal processor, color data using the signal of the pixels having the color filters of red and blue.

* * * * *

UNITED STATES PATENT AND TRADEMARK OFFICE
CERTIFICATE OF CORRECTION

PATENT NO. : 10,462,432 B2  
APPLICATION NO. : 14/973393  
DATED : October 29, 2019  
INVENTOR(S) : Onishi et al.

Page 1 of 1

It is certified that error appears in the above-identified patent and that said Letters Patent is hereby corrected as shown below:

On the Title Page

Item (30) for the Foreign Application Priority Data information, after the text "Dec. 26, 2014":
Delete "(JP)" and insert -- (PCT/JP) --.

Signed and Sealed this
Nineteenth Day of May, 2020

Andrei Iancu
*Director of the United States Patent and Trademark Office*